(12) United States Patent
Luka

(10) Patent No.: US 6,391,193 B1
(45) Date of Patent: May 21, 2002

(54) DUAL FILTER

(75) Inventor: Helmut Luka, Kornwestheim (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/555,271
(22) PCT Filed: Nov. 14, 1998
(86) PCT No.: PCT/EP98/07295
  § 371 Date: Dec. 4, 2000
  § 102(e) Date: Dec. 4, 2000
(87) PCT Pub. No.: WO99/28009
  PCT Pub. Date: Jun. 10, 1999

(30) Foreign Application Priority Data

Nov. 26, 1997 (DE) .......................................... 197 52 376

(51) Int. Cl.[7] ............................................... B01D 27/14
(52) U.S. Cl. .................... 210/130; 210/323.2; 210/438; 210/440; 210/450; 210/DIG. 13; 210/DIG. 17
(58) Field of Search ................................ 210/232, 314, 210/316, 323.2, 438, 457, 458, DIG. 13, DIG. 17, 130, 440, 443, 450, 493.2

(56) References Cited

U.S. PATENT DOCUMENTS

| 3,246,920 A | * | 4/1966 | Pall ............................. 210/232 |
| 3,586,171 A | * | 6/1971 | Offer .......................... 210/136 |
| 4,265,748 A | * | 5/1981 | Villani et al. ............... 210/132 |
| 4,559,138 A | * | 12/1985 | Harms, II ................... 210/316 |
| 5,217,606 A | * | 6/1993 | Ramponi et al. ........... 210/136 |
| 5,447,627 A | * | 9/1995 | Loafman .................... 210/316 |

FOREIGN PATENT DOCUMENTS

| EP | 362554 | * | 4/1990 |
| EP | 558828 | * | 9/1993 |

* cited by examiner

Primary Examiner—Matthew O. Savage
(74) Attorney, Agent, or Firm—Crowell & Moring LLP

(57) ABSTRACT

Several filter elements (13, 14) for purifying a liquid are connected with a connecting piece (21) to form a single structural unit which is then arranged in a filter housing (12). One of the advantages of the invention is that the filter elements (13, 14) can be connected before they are introduced into the filter housing (12). This makes the final assembly of the complete filter (11) considerably easier by reducing the number of parts. The connecting piece (21) can also be used to separate a flow of liquid into two partial flows which can be filtered through different filter elements so that they differ in their degree of purity.

15 Claims, 2 Drawing Sheets

DUAL FILTER

FIELD OF APPLICATION AND STATE OF THE ART

The invention relates to a filter having at least two filter elements which are arranged in an axially successive manner in a common filter cartridge and which, in particular, form a fine filter and a coarse filter for filtering contaminated liquids.

A dual filter of this type is known from European Patent Document EP 0 558 828 B1, in which a coil spring is situated between the fine filter and the coarse filter, which are both axially successively arranged in a filter cartridge housing. This coil spring presses the fine filter against the housing lid in order to seal off their connection with respect to one another. By means of another coil spring, the coarse filter is supported against the housing floor and, against the force of the first coil spring, is sealingly pressed against the fine filter.

Although, it is possible in this manner to arrange two, possibly different filter elements in a filter cartridge, as a result of the large number of individual components to be combined during the assembly operation, the assembly of the filter requires high expenditures and is susceptible to errors.

OBJECT AND SOLUTION

It is therefore an object of the invention to provide a filter having at least two filter elements which can be assembled at low cost without disturbances during the final assembly and which operates in a reliable manner.

This object is achieved by means of connecting devices, by which the filter elements can be directly connected with one another to form a structural unit to be arranged in the filter cartridge. During the final assembly, this results in the important advantage that only the structural unit consisting of the filter elements must still be inserted into the housing of the filter cartridge, while according to the mentioned prior art at least four parts had to be inserted. The final assembly takes place much more rapidly and faults, which otherwise may result in rejects and high-cost repair work, can largely be avoided. A fitting or positioning of the filter elements with respect to one another is automatically achieved during the final assembly. The operating step of connecting the filter elements by means of connecting devices to form a structural unit can preferably take place directly after the production of the filter elements and of the connecting devices, so that the finished structural units can be handled more easily than the individual filter elements. The connecting devices are advantageously constructed such that the connection can be established in a simple manner and can occur at least partly automatically.

For each connection of two filter elements, the connecting devices can be provided on only one or, as an alternative, on both filter elements. Furthermore, it is possible to provide one connecting device for one connection respectively between two filter elements, or a single connecting element for all filter elements installed in the filter. Particularly preferably, the connecting devices are provided in the area of the connection point between the filter elements, particularly fixedly mounted on one filter element and releasably mounted on the other filter element. In this manner, a precisely defined assembly and disassembly of the structural unit can be carried out because the sequence of the mounting of the connecting devices of the filter elements is specified. As a result of the releasability of the connection at one point, individual filter elements can be exchanged.

In a preferred embodiment, the connecting devices consist of a synthetic resin material and connect the filter elements in a force-locking manner, preferably by means of molded-on catches. Such a connection can be closed and released without any tool. As an alternative, a connection, particularly a fixed connection, can take place by gluing or the like. Some type of threaded connection would also be conceivable.

Preferably, at least two filter elements are arranged such that the liquid can essentially flow through them in parallel. The filter elements preferably differ with respect to their degree of filtration; in particular, at least one is constructed as a fine filter element and one is constructed as a coarse filter element. The parallel arrangement permits an increased flow rate through the filter, which may mainly be advantageous in the case of different filtering stages because the fine filter (as a rule, with a lower throughput) takes over only a portion of the overall throughput so that a sufficient overall throughput is therefore assured. The fine filtering of only a portion of the liquid flow is considered to be sufficient.

At least two filter elements can be constructed in different sizes. While the cross-sectional surface is the same, they can preferably have different axial dimensions. Particularly when fine filters and coarse filters are used, this is advantageous because the fine filter can have a smaller construction in such a case.

A preferred embodiment of the invention has a dividing device for dividing the fluid flow into at least two sub-flows, particularly into a main flow and into a secondary flow, in which case, preferably a liquid flow can be divided into various sub-flows after separately passing through filter elements. A division preferably takes place into one clean liquid flow and one cleanest liquid flow respectively which differ with respect to the degree of purity. Such an arrangement will be especially advantageous if the liquid flow to be purified is to be used for different purposes which each make different demands on the purity. The dividing device can advantageously be part of the connecting devices in order to reduce the number of components.

Particularly preferably, the filter elements rest with their end faces against the connecting devices, in which case they can preferably be sealed off with respect to one another by the connecting devices or by a portion thereof. In this manner, the connecting devices additionally take over the advantageous function of sealing off the filter elements with respect to one another, which is particularly important when the liquid flow is divided into sub-flows.

In one preferred embodiment, at least one filter element is a folded paper filter, preferably a cylindrical expansion-bellows-type filter. Such a filter element can achieve a filtering in the radial direction and has a maximum of filtering surface while its volume is small.

As a main/secondary flow replaceable filter for cleaning an oil flow, preferably for an internal-combustion engine, the filter preferably is formed of two cylindrical filter elements, particularly a fine filter and a coarse filter, which by means of catches of a connecting element mounted on the fine filter, are connected with one another on the coarse filter to form a structural unit as a filter cartridge and are installed in a cup-like filter housing. Such a main/secondary flow replaceable filter is particularly suitable for a use in an internal-combustion engine, because different degrees of purity are desirable at different lubricating points of the engine. Thus, a higher purity is recommended, for example, at the valves than, for example, in the crankcase. Such a replaceable filter is simply exchanged for the old filter during an oil filter change.

Particularly advantageously, a pressure relief valve for bypassing at least one filter element can be provided in the filter, preferably in the area of a central opening of an end face of a filter element facing the bottom of the filter cartridge. Should a filter element be clogged by dirt and the minimum throughput considered necessary can no longer be achieved, a filter element can be bypassed by at least a portion of the liquid flow. This represents a type of safety function of the filter.

In addition to being contained in the claims, these and other characteristics are indicated in the specification and the drawings. The individual characteristics can be implemented separately or in the form of subcombinations in embodiments of the invention and in other fields and can represent advantageous and individually patentable embodiments for which protection is claimed here. The division of the application into individual paragraphs and intermediate headings does not limit the general validity of the information contained therein.

BRIEF DESCRIPTION OF THE DRAWINGS

A working embodiment of the invention is illustrated in the drawings and will be described in the following.

DESCRIPTION OF A PREFERRED EMBODIMENT

Figure 1:
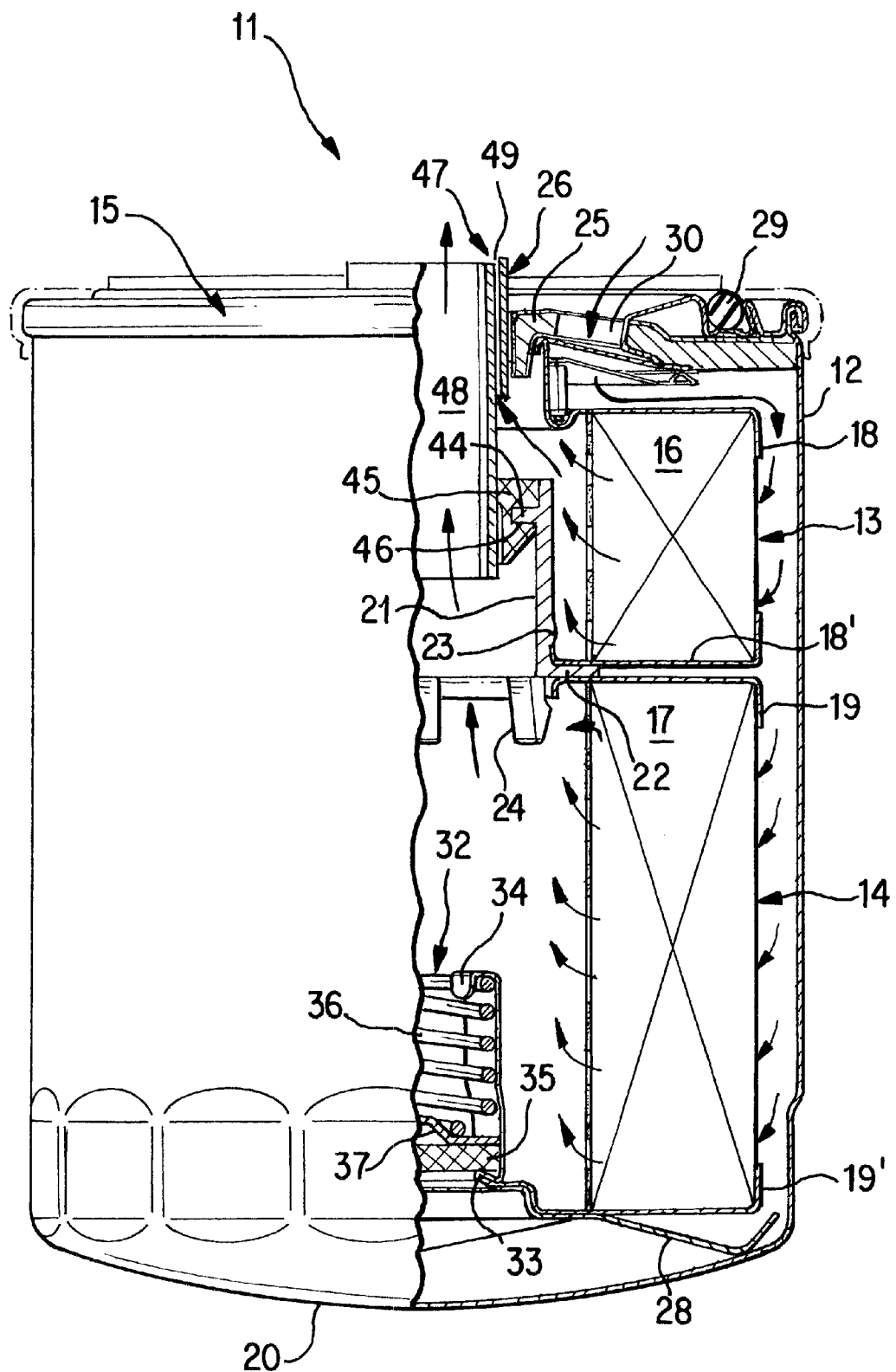
FIG. 1 is a lateral partial sectional view of a filter according to the invention consisting of two filter elements with a connecting piece in a filter cartridge housing.

FIG. 1 is a partial sectional view of a filter 11 according to the invention in whose cylindrical housing 12 a fine filter 13 and a coarse filter 14 are arranged which are axially aligned with this housing 12. These filter elements are constructed in the manner of a hollow cylinder and extend along the largest portion of the inner clearance of the housing 12, the coarse filter 14 being approximately twice as long as the fine filter 13. The circular ring thickness and the radius of the filter elements 13 and 14 amount to approximately half the radius of the housing 12 and are identical in the case of both filter elements.

The fine filter 13 as well as the coarse filter 14 are constructed as cylindrical expansion bellows filters which each consists of fine and coarse filtering media 16 and 17; in this case, of a fine-paper and coarse-paper collar which each have end plates 18 and 18' as well as 19 and 19' on their end faces for the purpose of sealing. The end plates 18 and 19, which close off the filtering devices 16 and 17 with respect to one another, may have identical constructions; extend by means of their outside diameter a distance around the filtering devices; and form substantially circular openings around the central longitudinal axis.

The fine filter 13 is connected with the coarse filter 14 by means of a connecting piece 21 which is essentially cylindrical and extends by means of its largest portion into the interior opening of the fine filter 13. In this case, it is disposed in a fitting manner in the opening formed by a section of the end plate 18' which extends radially inwardly and then at a right angle with respect to the lid 15 of the filter. Just above the edge 39 of the end plate 18', the connecting piece 21 has a circumferential bulge 23 on its exterior side or, as an alternative, has several cams, which, while resting against the edge 39, prevent the connecting piece from sliding out of the opening.

Detent cams 24, which are molded on the connecting piece 21 in a repeatedly radially distributed and axially extending manner, extend around the interior edge of the end plate 19 of the coarse filter 14 which projects downward in FIG. 1. In this manner, the fine filter 13 and the coarse filter 14 can be connected to form a structural unit by a simple insertion of one into the other by means of the connecting piece 21, the connection between the fine filter and the connecting piece being designed so that it can only be released with difficulty.

For centering the structural unit consisting of the filter elements, the inward-projecting upper area of the end plate 18 has a shape which is bent twice toward the inside in an S shape in the direction of the filter lid 15. A short downwardly extending tubular socket 25, which is molded to the underside of the filter housing lid 15, projects into the opening created in such a manner. This tubular socket 25 simultaneously forms the central oil outlet opening 26 which is provided with an internal thread. The connection between the metal housing 18 of the fine filter and the tubular socket 25 is sealed off. Sealing rings and rubber O-rings, for example, can be used for this purpose.

Figure 2:
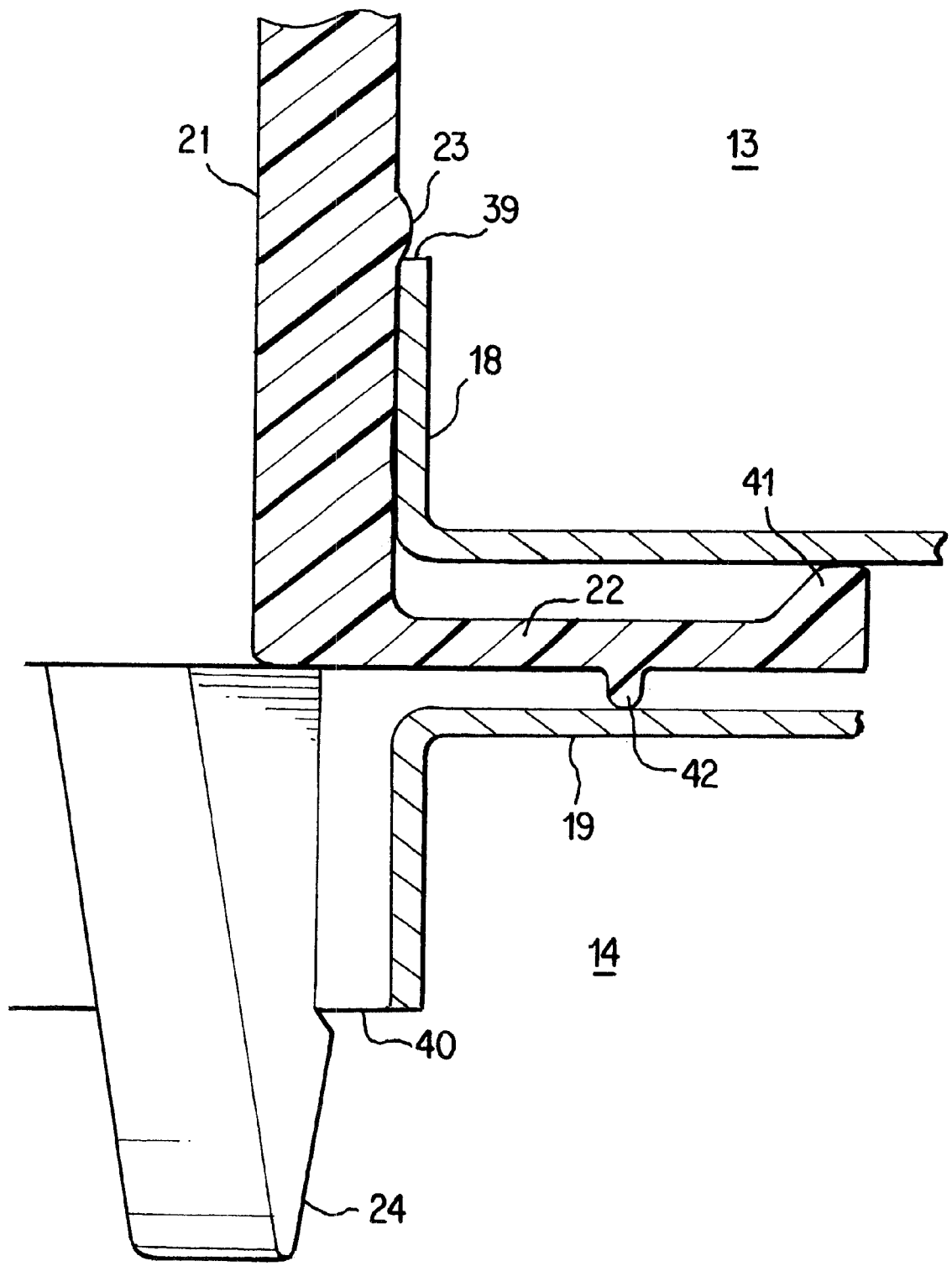
FIG. 2 is a greatly enlarged detail view of the connection of the connecting piece with the two filter elements.

The required sealing-off of the connection between the fine filter 13 and the coarse filter 14 in the area of the connecting points is achieved by a radially outwardly projecting rim 22 of the connecting piece 21, with the end plates 18' and 19 of the filter respectively resting against the two surfaces of the rim 22. Respective details are illustrated in FIG. 2.

The structural unit consisting of the filters 13 and 14 is supported against the housing bottom 20 of the filter 11 by means of an especially shaped disk spring 28. The spring force of this disk spring 28 essentially presses the upper part of the structural unit consisting of the S-shaped projection of the end plate 18 against the housing lid 15. The disk spring 28 can also contribute to the centering of the lower end of the structural unit.

A circumferential round seal 29 is inserted into the housing lid 15 which is connected with the housing 12 by means of a bent over (crimped) edge. This round seal 29 seals off the filter 11 with respect to a contact surface to which the filter 11 is screwed by means of the internal thread of the outlet opening 26. Furthermore, the inlet openings 30 are formed distributed around the oil outlet opening 26. Through this oil outlet opening 26, oil to be purified flows into the filter 11 (see bold arrow) and flows past the impermeable end plate 18 into the area of the filter 11 between the jacket of the filters 13 and 14 and the interior surface of the housing 12. There, the oil flows from the outside to the inside through the fine filter 13 as well as through the coarse filter 14, or in other words through the filtering media 16 and 17, whereby it is cleansed of impurities and dirt particles. The oil, which has been filtered in different ways, exits through the interior jacket surface of the filtering media 16 and 17, and flows through the central passages and the respective interior pipe of the filters in the direction of the oil outlet opening 26.

In the upper area, the connecting piece 21 has a radially inward-extending projection 44. A seal 45, which has a wedge-shaped design toward the inserted end, extends around this projection 44 which is received in a correspondingly shaped groove 46 of the seal, which preferably is formed of rubber. A double-walled pipe 47 extends from above into the central opening of the seal 45, this connection being sealed off by a sealing lip on the interior side of the opening of the seal. This pipe represents a part of a separating device for oil which has been filtered to a different degree of purity. After the mounting of the filter on the internal-combustion engine, the pipe member 47 arranged on the engine side, in conjunction with the seal 45, seals off the two partial sub-flows with respect to one another, which flow off either through the central part 48 or the intermediate part 49. The two walls of the pipe 47 can be connected with one another at specific points by circumferentially distributed holding ribs in order to maintain a sufficient flow-through cross-section.

As a safety function, a pressure relief valve 32 is inserted into the opening of the coarse filter 14 facing the housing bottom. In the area of the lower opening, the end plate 19' is folded inwardly as a constriction 33 of the diameter, extends approximately cylindrically in the direction of the top of the housing 12 and is provided at its end with radially distributed flaps 34 bent twice toward the interior by 900. Toward the inside, a valve plate 35 which seals off the lower opening is inserted against the constriction 33 of the diameter, which valve plate 35 preferably is comprised of a resilient material, such as synthetic resin. A coil spring 36 is clamped between the valve plate 35 and the flaps 34, which assures that the valve plate is sealingly seated against the constriction 33 of the diameter. The coil spring 36 rests against the valve plate 35 with a washer 37 interposed therebetween.

The strength of the coil spring 36 is dimensioned such that, starting from a certain oil pressure applied from below to the valve plate 35, the valve plate yields against the spring force and a direct inflow of oil is possible from the outer area of the filter into the central opening of the coarse filter 14. Such an excess pressure may be caused by clogged filter elements 13 and 14, in which case the pressure relief valve 32 continues to assure the oil supply of the internal-combustion engine, although with oil which has not been filtered.

In the greatly enlarged illustration of the connection point between the fine filter 13 and the coarse filter 14 in FIG. 2, the end plates 18' and 19 are shown hatched with a single line. The substantially cylindrical connecting piece 21 is seated in the central opening of the end plate 18 of the fine filter 13, a detachment of the structural unit formed from these two parts being prevented in that the surrounding bulge 23 contacts the edge 39 which projects upward in the drawing. Also shown are the detent cams 24 of the connecting piece 21 which extend around the downwardly projecting end edge 40 of the end plate 19 and thus create a connection.

The rim 22, which projects radially from the connecting piece 21, has an upwardly projecting upper sealing lip 41 on its outer diameter, which sealing lip 41 rests sealingly against the lower end face of the end plate 18'. Offset a distance radially inwardly there is a lower sealing lip 42 which projects from the underside of the rim 22 and which also rests sealingly against the upper end face of the coarse filter end plate 19. At least the rim 22 together with the two sealing lips 41 and 42 is rotationally symmetrical so that the sealing lips seal off the two end plates with respect to one another along their whole circumference.

This sealing-off is decisive so that no unpurified oil can pass between the filters 13/14 or the end plates into the central outlet duct. Instead of the sealing lips 41 and 42, seals, preferably sealing rings or a profile seal, or injection-molded-on sealing lips of resilient material can be provided on the rim 22 to achieve the required sealing.

By means of the bulge 23 and the detent cams 24 of the connecting piece, the two filters 13 and 14 are therefore connected to form a structural unit, with a portion of the connecting piece simultaneously ensuring a sealing-off of the two filters.

OPERATION

After the manufacturing process of the filtering elements and the connecting piece 21, the seal 45 is first fitted into this connecting piece 21; then the connecting piece is pressed into the opening of the end plate 18'. The bulge 23 thereby locks against the edge 39, and the connecting piece is fixedly attached to the fine filter 13. The pipe 47 is situated on the internal-combustion engine.

Next, the coarse filter 14, which is optionally already provided with the pressure relief valve 32, is pushed onto the end of the connecting piece with the detent cams 24 which projects out of the fine filter, which detent cams 24 lock into the housing edge of the filter to form a connection. These steps can take place manually. Likewise, because of the conception of the connections by means of detents, a machine assembly is also advantageously possible.

The structural unit of the two filter elements 13 and 14 united by means of the connecting piece 21 can now very easily be inserted into a filter housing 12, in the bottom 20 of which the disk spring 28 is situated. Difficulties with the fitting of the filter elements with respect to one another or a complicated fitting-together within the filter housing are eliminated. Subsequently, the filter housing lid 15 is placed on the filter housing 12 and is attached thereto by crimping the edge or the like, with its tubular socket 25 sealingly engaging in the upper portion of the end plate 18 of the fine filter 13.

When in use as a filter cartridge, the completed filter 11 is fastened on an internal combustion engine, for example, by means of an internal thread in the tubular socket 25, with a sealing occurring via the O-ring seal 29. Dirty oil (see bold arrow) from the engine into the filter through the oil inlet openings 30 in the filter housing lid 15. It flows into the area between the outsides of the filter elements 13 and 14 and the housing wall, is distributed there and is simultaneously forced through the fine filter 13 as well as through the coarse filter 14 (see small arrows). On the interior side of the filtering media 16 and 17, the purified oil leaves the filtering devices (see small arrows), the respective throughput depending on the filter geometries and especially on the degree of filtration.

While subsequently a clean oil flow passing through the coarse filter 14 is discharged from the filter 11 through the central portion of the pipe 47 (see medium thick arrow), a cleaner oil flow passing through the fine filter 13 flows out of the filter 11 between the walls of the pipe 47 (see medium thick arrow). Outside the filter 11, preferably at the connection surface, the two oil flows can be conveyed further separately from one another, in a manner not shown. It is useful, for example, to use the cleanest oil flow for lubricating the valves, while the clean oil flow can be used for less stressed lubricating points, as for example, the crankshaft.

What is claimed is:

1. A filter comprising tubular shaped first and second filter elements each having an annular end plate arranged on at least one end face thereof, the end plates of the first and second filter elements being connected together by way of a connecting piece to form a structural unit which can be installed in a filter housing;

wherein the connecting piece comprises (i) a tubular portion extending through an aperture of one of said annular end plates, (ii) a circumferential bulge extending about an exterior circumferece of the tubular portion which engages an edge said one end plate to attach the first filter element to the connecting piece and, (iii) a plurality of detent cams extending from an end of said tubular portion which interlockingly engage an edge of an aperture of the other annular end plate to attach the second filter element to the connecting piece to form the structural unit.

2. A filter according to claim 1, wherein the connecting piece is made of synthetic resin material.

3. A filter according to claim 1, wherein said first and second filter elements differ from each other in degree of filtration, one being a coarse filter, and the other being a fine filter, and said first and second filter elements are arranged so that the liquid can flow through them in parallel.

4. A filter according to claim 1, wherein said first and second filter elements differ in size.

5. A filter according to claim 4, wherein said first and second filter elements are cylindrical filter elements having substantially the same diameter and differing axial lengths.

6. A filter according to claim 1, wherein the first and second filter elements divide the liquid flow into two partial flows, wherein one partial flow passes through the first filter element, and the other partial flow passes through the second filter element.

7. A filter element according to claim 6, wherein on of said first and second filter elements is a coarse filter, and the other of said filter elements is a fine filter, and the partial flows are maintained separate by said connecting piece after passage through the respective filter elements to obtain filtered liquids having differing degrees of purity.

8. A filter element according to claim 1, wherein said first and second filter elements are cylindrical and axial end faces of each of the end plates rest against a rim of the connecting piece that extends radially outwardly from the end of the tubular portion and is axially positioned between the circumferential bulge and the detent cams.

9. A filter element according to claim 8, wherein the rim of said connecting piece seals said first and second filter elements relative to each other.

10. A filter according claim 1, wherein at least one of said first and second filter elements comprises a cylindrical pleated paper filter.

11. A filter element according to claim 1, wherein said structural unit is installed in a cylindrical housing.

12. A filter according to claim 11, further comprising a pressure relief valve for bypassing one of said filter elements in the event said one filter element becomes clogged.

13. A filter according to claim 12, wherein said pressure relief valve is disposed in a central opening of an end wall of the filter element facing a base of the filter housing.

14. A filter according to claim 1, wherein a seal comprising an opening is arranged on the tubular portion of the connecting piece and a pipe for filtered liquid is arranged in the opening.

15. A filter according to claim 14, wherein the seal is made of rubber.

* * * * *